US010743656B2

(12) United States Patent
Sánchez Zarza

(10) Patent No.: US 10,743,656 B2
(45) Date of Patent: Aug. 18, 2020

(54) DETACHABLE BEDSIDE TABLE FOR MATTRESS ASSEMBLY

(71) Applicant: LANGEL SYSTEM INTERNATIONAL, S.L., Saragossa (ES)

(72) Inventor: Alberto Sánchez Zarza, Saragossa (ES)

(73) Assignee: LANGEL SYSTEM INTERNATIONAL, S.L., Saragossa (ES)

(*) Notice: Subject to any disclaimer, the term of this patent is extended or adjusted under 35 U.S.C. 154(b) by 85 days.

(21) Appl. No.: 16/099,620

(22) PCT Filed: May 10, 2017

(86) PCT No.: PCT/EP2017/061174
§ 371 (c)(1),
(2) Date: Nov. 7, 2018

(87) PCT Pub. No.: WO2017/194603
PCT Pub. Date: Nov. 16, 2017

(65) Prior Publication Data
US 2019/0133314 A1 May 9, 2019

(30) Foreign Application Priority Data

May 11, 2016 (ES) ............................. 201630597 U

(51) Int. Cl.
*A47B 23/02* (2006.01)
*A47B 23/00* (2006.01)
(Continued)

(52) U.S. Cl.
CPC ............ *A47B 23/025* (2013.01); *A47B 23/00* (2013.01); *A47B 23/06* (2013.01); *A47C 21/00* (2013.01);
(Continued)

(58) Field of Classification Search
CPC .......... A47C 21/00; A47C 31/00; A61G 7/05; A61G 7/0503; A47B 23/00; A47B 23/02; A47B 23/025; A47B 23/06
(Continued)

(56) References Cited

U.S. PATENT DOCUMENTS

| 3,654,646 | A | 4/1972 | McMahon |
| 3,922,973 | A | 12/1975 | Sturgeon |
| 5,973,917 | A | 10/1999 | White |
| 8,185,987 | B2 * | 5/2012 | Keehfus ................ A47C 21/00 248/311.2 |

(Continued)

FOREIGN PATENT DOCUMENTS

| KR | 20100049136 | 5/2010 |
| KR | 20100049136 A | 5/2010 |
| WO | WO/2014/075928 A1 | 10/2013 |

OTHER PUBLICATIONS

Notification of transmittal of the International Search Report and the Written Opinion of the International Searching Authority for Application No. PCT/US2017/061174 issued by the International Searching Authority, European Patent Office, Rijswijk, NL dated Aug. 8, 2017, 1 page, which includes: The International Search Report completed Jul. 28, 2017 dated Aug. 8, 2017, 7 pages, with Written Opinion of the International Searching Authority for International Application No. PCT/US2017/061174 dated Aug. 8, 2017 issued by the European Patent Office, Rijswijk, NL.

*Primary Examiner* — Robert G Santos
(74) *Attorney, Agent, or Firm* — Peter B. Scull; HDC IP Law LLP

(57) ABSTRACT

A bedside table to be arranged in an area of a folding side extension of a mattress assembly. The bedside table includes a surface suitable for receiving or storing at least one object and apparatus for releasably attaching the surface of the bedside table to the folding lateral extension of the mattress assembly, such that the surface of the bedside table can be releasably attached to the mattress assembly even when the lateral extension is being folded or it is already folded.

14 Claims, 1 Drawing Sheet

(51) Int. Cl.
*A47B 23/06* (2006.01)
*A47C 21/00* (2006.01)
*A61G 7/05* (2006.01)
*F16B 1/00* (2006.01)

(52) U.S. Cl.
CPC .............. *A61G 7/0503* (2013.01); *F16B 1/00* (2013.01); *F16B 2001/0028* (2013.01); *F16B 2001/0035* (2013.01)

(58) Field of Classification Search
USPC ........................................ 5/507.1, 503.1, 658
See application file for complete search history.

(56) References Cited

U.S. PATENT DOCUMENTS

| | | | | |
|---|---|---|---|---|
| 8,375,487 | B1 * | 2/2013 | Mohr ..................... | A47C 21/00 5/424 |
| 8,572,784 | B2 * | 11/2013 | Keehfus ................. | A47C 21/00 248/311.2 |
| 8,844,074 | B2 * | 9/2014 | Mohr ..................... | A47C 21/003 5/424 |
| 8,898,836 | B1 * | 12/2014 | Puri ..................... | A61G 7/0503 248/302 |
| 2011/0277239 | A1 * | 11/2011 | Keehfus ................. | A47C 21/00 5/503.1 |
| 2012/0211622 | A1 * | 8/2012 | Keehfus ................. | A47C 21/00 248/274.1 |
| 2012/0261539 | A1 | 10/2012 | Huang | |
| 2014/0215716 | A1 * | 8/2014 | Mohr ..................... | A47C 21/00 5/507.1 |
| 2019/0133314 | A1 * | 5/2019 | Sńchez Zarza ........ | A47B 23/00 |

* cited by examiner

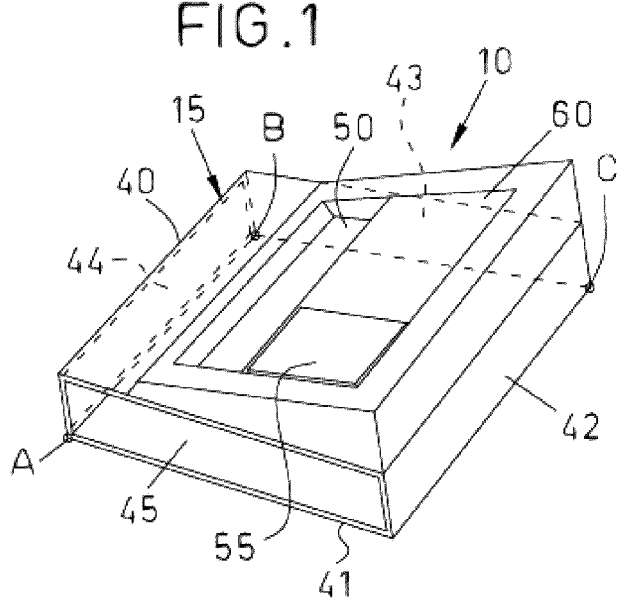
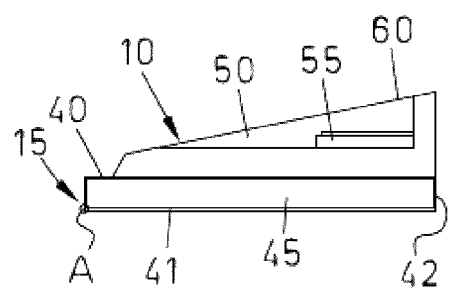
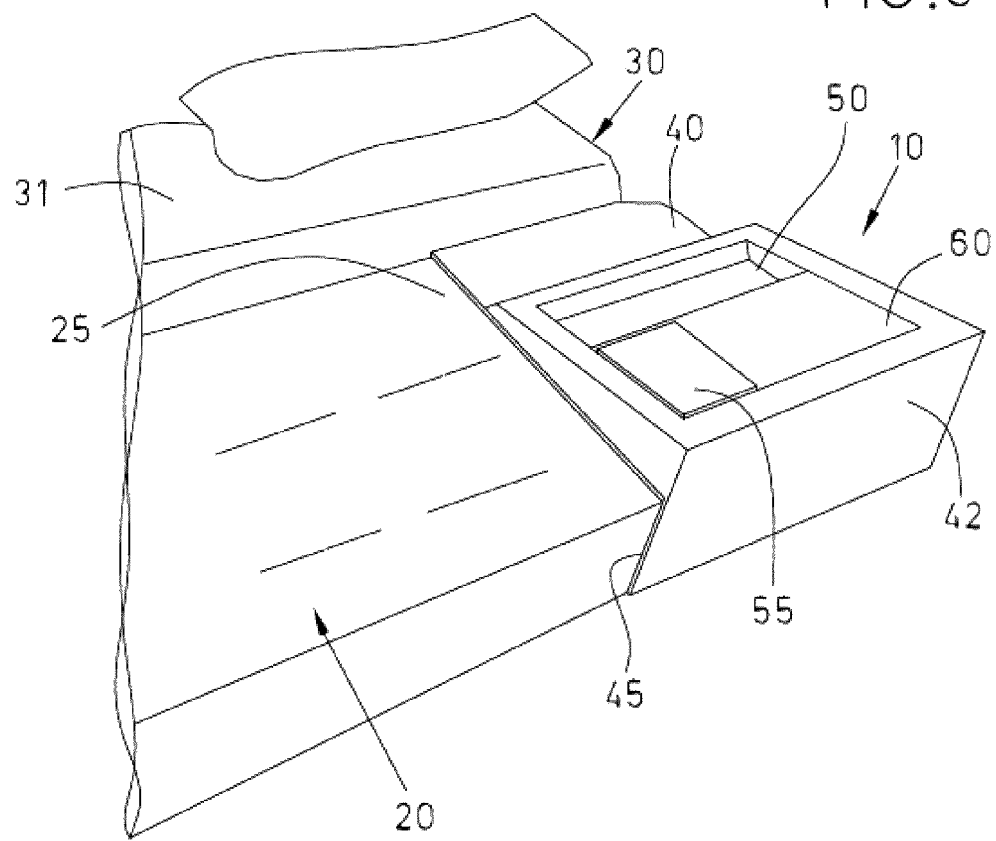

DETACHABLE BEDSIDE TABLE FOR MATTRESS ASSEMBLY

The present developments relate to a bedside table suitable to be attached to a mattress assembly, in particular to be releasably attached to a folding lateral extension of a mattress assembly.

There are currently many types and models of bedside tables according to tastes, needs, decoration and space in a room or bedroom where a bedside table is intended to be placed. A bedside table, as an item of furniture intended to be placed next to a bed, is therefore a functional object that, in addition, complements the decoration of the bedroom where it is placed.

Regardless of the size of the bedroom, there is now a tendency to use fewer bedside tables. This is mainly because they take up a lot of space and they increasingly benefit less from the functionality they usually offer to store objects in drawers or other spaces provided therein. Their functionality is relegated almost exclusively to place objects thereon, such as a lamp, a glass, a telephone, etc.

The current subject matter proposes a substitute for conventional bedside tables known hitherto. Specifically, a bedside table is provided to be applied to mattress assemblies having folding lateral extensions. The purpose of the proposed bedside table is to make it possible to maintain the functionality of supporting and storing objects with a piece of furniture that takes up very little space.

A mattress assembly in which the bedside table hereof preferably finds application is, for example, a mattress assembly with folding lateral extensions such as that described in the international patent application WO/2014/075928, to the same holder of the present subject matter. This mattress assembly is configured to expand its surface. For this purpose, the mattress assembly has in some implementations a central body having two or more lateral extensions and in some implementations a footboard extension. In some versions of the mattress assembly, it further may have a headboard extension. The folding extensions of the mattress assembly may be allowed to be folded at an angle so that they can form an extension of the surface in a plane completely horizontal relative to the central body or arranged in a plane perpendicular to the central body respectively. Other angular positions of the folding lateral extensions are also possible.

The bedside table hereof has a surface that is intended to be arranged in an area of the folding lateral extension of such mattress assembly. The surface of the bedside table may be however extended substantially covering the entire lateral extension of the mattress assembly, as required.

In any case, the presently-described surface of the bedside table is intended for receiving or storing at least one object, such as a mobile telephone, a tablet, a laptop, a lighting device, such as a lamp, or other objects. The surface of the bedside table hereof may be made of any suitable rigid material, such as plastic, metal, wood, or combinations of these materials. This surface may however be also made of a flexible material or even of a suitable textile or fabric. The surface may be transparent, translucent, opaque, coloured, it may be provided with ornamentation, including a combination of the above and/or include display device such as, for example, an information display screen such as a flexible type screen.

The bedside table hereof may include apparatus for releasably attaching said surface to the folding lateral extension of the mattress assembly. This releasable attaching apparatus may be such as to enable the bedside surface to be releasably or removably attached to the mattress assembly even when the lateral extension is lowered or folded.

In one example of such a releasable attaching apparatus for the bedside table, this may include an extension of the bedside surface adapted to suitably fit, for example, press fit, in the lateral extension of the mattress assembly. The releasable attaching apparatus may also be formed as a box shaped body with an interior adapted to receive a portion of the folding lateral extension of the mattress assembly. Fitting of the folding lateral extension of the mattress assembly may preferably be a press fitting. Further examples for releasably attaching the bedside table may be formed by grippers adapted to attach to the lateral extension of the mattress assembly. Yet a further example for releasably attaching the bedside table may include at least one magnetic area adapted to be attached to the lateral extension of the mattress assembly. Further implementations for releasably attaching the bedside table are not ruled out, such as, for example, a Velcro® area associated, for example, with the bedside table surface adapted to attach to the lateral extension of the mattress assembly.

It is envisaged that, in some versions of the bedside table, it may include a suitable device or mechanism for connecting a mobile device, such as a mobile telephone, a tablet, a laptop computer or the like, to an appropriate power supply. In some implementations, the bedside table may include connecting the mobile device in a manner that provides said mobile device with information about the mattress assembly. In other implementations, the present bedside table may include home domotic control devices or mechanisms, for example for controlling the lights in a room.

The bedside table may include an interior space suitable for storing one or more objects. This interior space of the bedside table may be formed of one or several receptacles, that is, the interior space may be provided with partitions for orderly storing various objects. The receptacles may be all equal, all different or only some of them equal.

A cover may also be provided, for example a hinged cover or a sliding cover, to cover at least partially that interior space. The cover may in some cases define the surface of the bedside table.

One or several of the receptacles may be one or more pockets. The pockets may be opened or they may include a conventional closure, such as a zipper, button, Velcro®, snap fasteners, a magnetic apparatus and the like. In some implementations, a device may be provided for hinging the bedside table surface to the lateral extension of the mattress assembly. This would, for example, allow said surface to be concealed in the lateral extension of the mattress assembly. Specifically, the hinging device may include a suitable hinge so that the bedside table surface can be rotated to be arranged at different slopes or angular positions and/or also concealed in a lower part of the lateral extension of the mattress assembly, as stated above.

In some cases, provision of a gyroscope or similar mechanism is also envisaged so as to maintain the stability of the bedside table surface at a required angle, irrespective of the degree of inclination of the lateral extension of the mattress assembly. This solution would make it possible to convert the lateral extension of the mattress assembly into a rigid surface suitable for eating in residences, changing of babies' diapers, or simply for leisure and/or work in homes and hospitals.

Additional objects, advantages and features of examples of the present subject matter will become apparent to those skilled in the art upon examination of the description, or may be learned by practice of the hereof.

BRIEF DESCRIPTION OF THE DRAWINGS

A particular implementation of a bedside table according to the present developments will now be described by way of a non-limiting example with reference to the accompanying drawings.

In the drawings:

FIG. 1 shows a perspective view of one particular example of a bedside table according to the present disclosure;

FIG. 2 shows a side elevational view of the bedside table illustrated in FIG. 1; and FIG. 3 shows a fragmentary perspective view of a folding lateral extension of a mattress assembly with a bedside table as shown in FIGS. 1 and 2 attached thereto.

DETAILED DESCRIPTION

In the non-limiting example that is illustrated in FIGS. 1-3, the bedside table has been denoted as a whole by reference numeral 10. The bedside table 10 of the example shown in said FIGs. is adapted to be releasably attached to a folding lateral extension 20 of a mattress assembly 30 such as that described in the international patent application WO/2014/075928.

One example of such a mattress assembly 30 is shown in FIG. 3 of the drawings. It is a mattress assembly 30 that is configured to allow its surface to be adequately expanded and, at the same time, to provide the user with a safety mechanism to prevent her/him from falling to the ground. For this purpose, folding lateral extensions 20 are provided which can be folded at different slopes or angular positions with respect to the main mattress 31. For example, the folding lateral extensions 20 may be folded to form an angle of 0 or 180° relative to the main mattress 31 so as to provide the user with an extended surface. The folding lateral extensions 20 may also be folded so as to be arranged at an angle of substantially 90° relative to the main mattress 31 in order to provide the user with a safety barrier to prevent the user from falling to the ground. Other angular positions of the folding extensions are also possible as required.

The lateral extensions 20 of the mattress assembly 30 may be made of a single piece or several lateral extensions may be provided which may be folded independently of each other so as to be each arranged in different predetermined positions relative to the main mattress 31 of the mattress assembly 30.

In addition to the folding lateral extensions 20, the mattress assembly 30 to which the bedside table 10 is applied may include a folding footboard extension and, in some implementations, it may further include a folding headboard extension (not shown).

The mattress assembly 30 may further include a tubular structure provided in the contour of said folding extensions. Such tubular structure of the mattress assembly 30 may be fixed or factory fitted, or it can be assembled by the user through suitable a quick lock and release device.

The bedside table 10 of the non-limiting example shown in the FIGs. may include a surface 40 which may be, for example, about 20×40 cm or 20×60 cm. Other suitable sizes for the surface 40 are of course possible depending on the needs, functionality, the area of the lateral extension 20 of the mattress assembly 30 to be covered, etc.

This surface 40 may be made of any suitable material, such as rigid plastic, metal, wood, or combinations thereof. In other examples, the surface 40 of the bedside table 10 may be made of a flexible material or even of an appropriate textile or fabric material.

The surface 40 of the bedside table 10 is intended to be placed in an area 25 of the folding lateral extension 20 of the mattress assembly 30. This area 25 may be located, for example, near the area of the pillow, as illustrated in FIG. 3 of the drawings. In other examples, the area 25 where the bedside table 10 is arranged may be located further away from the area of the pillow. In yet further examples, surface 40 of the bedside table 10 may be extended covering substantially the entire folding lateral extension 20 of the mattress assembly 30 rather than partially as illustrated in FIG. 3 of the drawings.

As can be seen in FIG. 1 and in FIG. 2, the surface 40 of the bedside table 10 is part of a body inside of which a space 50 can be defined. This interior space 50 of the bedside table 10 is suitable for storing objects, for example a mobile telephone 55, as illustrated in the example shown in FIGS. 1-3. Although not shown in said FIGs., connecting a mobile telephone 55 or other mobile devices, such as a tablet, a laptop computer or the like, to a power supply, and/or suitable connecting of said mobile device 55 to provide information about the mattress assembly 30, for example about the main mattress 31, and/or suitable devices or mechanisms for domotic control of a home or a part thereof, for example, for controlling the lights in a room, may be provided in the inner space 50 of the body of the bedside table 10.

In order to cover or at least partially close the interior space 50 of the table 10, a cover 60 may be provided. The cover 60 may be a folding cover, a sliding cover or any other suitable type of cover which allows easy access to the interior of the interior space 50 of the bedside table 10. The cover 60 may be made of an appropriate transparent material, although it may be made of a translucent or opaque material, to at least partially conceal the object or objects stored inside. The cover 60 may be provided with an ornamentation on its outer surface as desired, and even with light. Implementations where the cover 60 is provided with a display such as, for example, an information display screen, such as a touch screen, a flexible type screen, a roll-up screen or the like, are not ruled out.

In order to attach the surface 40 of the bedside table 10 in the area 25 of the folding lateral extension 20 of the mattress assembly 30, a releasable attaching apparatus 15 may be provided. This releasable attaching apparatus 15 is adapted to allow the surface 40 of the bedside table 10 to be releasably attached to the mattress assembly 30 even when the lateral extension 20 is already folded or as it is being folded by the user.

In a particular, non-limiting example of the apparatus 15 for releasably attaching the bedside table 10 that is shown in FIGS. 1, 2 and 3 of the drawings, this may include a box shaped body 15 which is associated with the surface 40 of the bedside table 10. Specifically, in this implementation, the surface 40 is part of the box shaped body 15. Said box shaped body 15 is clearly shown in the perspective view of FIG. 1 and also in the elevational view of FIG. 2 of the drawings. The box shaped body 15 is formed, as it has been indicated, by the surface 40 of the bedside table 10, and also by a lower surface 41, that is substantially parallel to said surface 40 of the bedside table 10, and by respective adjacent surfaces 42, 43. Said adjacent surfaces 42, 43 are substantially perpendicular to each other and join the surface 40 of the bedside table 10 and the lower surface 41. Such configuration defines, as described, a box shaped body 15, which is opened through two adjacent openings 44, 45. These two adjacent openings 44, 45 are defined at, or correspond to, adjacent surfaces of the box shaped body 15 other than the adjacent surfaces 42, 43. These openings 44, 45 of the box shaped body are sized to allow the area 25 of the folding lateral extension 20 of the mattress assembly 30 to be properly received, until the bedside table 10 is releasably suitably attached to the mattress assembly 30. The bedside table 10 is thus secured to the mattress assembly, even when the lateral extension 20 that is being folded by the user in order to place it to the desired position is folded in a vertical upward position, forming a barrier to the user for preventing her/him from falling to the ground.

It is apparent that if the user places the lateral extension 20 folded in a vertical downward position, then the adjacent openings 44, 45 would now be solid adjacent surfaces and the solid adjacent surfaces 42, 43 would be adjacent openings.

The condition for the areas 42, 43, 44, 45 to be solid surfaces or openings may be interchangeable according to whether the lateral extension 20 is folded in a vertical upward or downward position. This configuration would allow the bedside table 10 to be positioned anywhere on the mattress assembly 10.

It should be noted that, although in the example shown, the lower surface 41 of the box shaped body 15 is shown substantially the same as the surface 40 of the bedside table 10, the lower surface 41 may, in other possible implementations, have a substantially triangular configuration. That is, the lower surface 41 of the box shaped body 15 may be defined by a triangle passing through vertices A, B, C defined by the wall 43 and the area of the opening 44, as shown in FIG. 1.

The configuration of the releasable attaching apparatus as a box shaped body 15, as in the example shown in FIGS. 1-3, enables the bedside table 10 to be assembled and disassembled by the user very quickly, easily and conveniently in the folding lateral extension 20 of the mattress assembly 30 through the openings 44, 45 in the body as described.

Specifically, the bedside table 10 can be assembled by the user very simply and very quickly in the mattress assembly 30 by suitably pushing the box shaped body 15 towards the lateral extension 20 until it is properly inserted into said body 15. Once the lateral extension 20 is inserted inside the bedside table 10, it is held securely, for example, press fitted, so that, although the folding lateral extension 20 of the mattress assembly 30 is folded, it does not fall due to the adjacent lateral surfaces 42, 43 of the box shaped body.

Although it is not necessary, additional or complementary attaching apparatus or devices may be provided to hold the bedside table 10 in the folding lateral extension 20, once it has been inserted into the other.

The bedside table 10 can be also detached from the mattress assembly 30 by the user very quickly and very conveniently by easily pulling the box shaped body 15 outwardly of the lateral extension 20 to remove it from the interior thereof. This allows the user to store the bedside table 10 conveniently when not in use, or place it in another different mattress in the same or another room, or in another lateral extension 20 of the same mattress. etc. Given the very small space taken up by the bedside table 10 hereof, the user may have several bedside tables 10 with different and varied ornamentations and/or functionalities, according to tastes and needs. The user thus has the possibility to change the decoration of the room. Even if desired different bedside tables may be provided in the same room, which can be exchanged when and as desired. The user can easily change the type of bedside table 10 to be placed at any time depending on the taste and/or functionality thanks to the great ease, comfort and speed in the exchange of the bedside tables 10 in the mattress assembly 30.

Although only a number of particular implementations and examples of the present developments have been disclosed herein, it will be understood by those skilled in the art that other alternative implementations and/or uses and obvious modifications and equivalents thereof are possible. The scope of the present disclosure should therefore not be limited to the particular example that has been disclosed, but should be determined only by a fair reading of the claims that follow.

Thus, although the bedside table that has been disclosed herein includes an apparatus or mechanism for releasably attaching to a lateral extension of a mattress assembly, said releasable attaching apparatus or mechanism may be adapted to attach the bedside table to another part of the mattress assembly, such as a structure thereof.

Also, the bedside table that has been disclosed herein may be provided with a device for controlling some features of the mattress assembly, such as, for example, internal ventilation of the mattress by controlling small fans arranged to blow air into the mattress through small holes, adjusting lighting provided in the structure of the mattress or any other part thereof, etc.

The invention claimed is:

1. A detachable bedside table for a folding side extension of a mattress assembly, the detachable bedside table comprising:
   a surface suitable for receiving or storing at least one object, the surface being configured to be arranged in an area of the folding side extension of the mattress assembly; and
   an apparatus for releasably attaching the surface of the detachable bedside table to the folding side extension of the mattress assembly, configured so that the surface of the detachable bedside table can be releasably attached to the mattress assembly even when the folding side extension is being folded or when the folding side extension is already folded;
   said apparatus for releasably attaching comprising a box shaped body associated with the surface of the detachable bedside table, the box shaped body having an interior configured to receive a portion of the folding side extension of the mattress assembly, said box shaped body having two adjacent openings defined at, or corresponding to, adjacent surfaces of the box shaped body, said two adjacent openings being configured to allow the portion of the folding side extension of the mattress assembly to be received therein, to releasably attach the detachable bedside table to the mattress assembly.

2. The detachable bedside table according to claim 1, the surface being made of a rigid material.

3. The detachable bedside table according to claim 1, the surface of the detachable bedside table extending substantially covering the entire folding side extension of the mattress assembly.

4. The detachable bedside table according to claim 1, the apparatus for releasably attaching comprising at least one of:
grippers configured to attach to the folding side extension the mattress assembly,
a magnetic area configured to attach to the folding side extension of the mattress assembly, and
a hook and loop fastener area configured to attach to the folding side extension of the mattress assembly.

5. The detachable bedside table according to claim 1, the bedside table including an interior space for storing objects.

6. The detachable bedside table according to claim 5, the bedside table including a cover for at least partially covering said interior space.

7. The detachable bedside table according to claim 6, the cover being configured to be folded.

8. The detachable bedside table according to claim 6, the cover defining said surface for receiving or storing at least said objects.

9. The detachable bedside table according to claim 1, the detachable bedside table including a hinging device for hinging the surface of the detachable bedside table with respect to the folding side extension of the mattress assembly to allow said surface to be concealed in said folding side extension.

10. The detachable bedside table according to claim 1, the detachable bedside table including a device or mechanism for connecting a mobile device to a power supply.

11. The detachable bedside table according to claim 1, the detachable bedside table including a device or mechanism for connecting a mobile device for sending information to said mobile device about the mattress assembly.

12. The detachable bedside table according to claim 1, the detachable bedside table including at least one device or mechanism for home domotic control.

13. The detachable bedside table according to claim 1, the detachable bedside table including a device or mechanism for controlling lights in a room.

14. The detachable bedside table according to claim 1, the detachable bedside table it including a gyroscope to maintain the stability of the surface at an angle irrespective of the degree of inclination of the folding side extension of the mattress assembly.

* * * * *